United States Patent [19]

Laidig

[11] 4,365,566
[45] Dec. 28, 1982

[54] SWITCH PATTERN SELECTION AND INFORMATIONAL DISPLAY ARRANGEMENT FOR A MULTIPLE PATTERN SEWING MACHINE

[75] Inventor: Manfred R. Laidig, Whippany, N.J.
[73] Assignee: The Singer Company, Stamford, Conn.
[21] Appl. No.: 268,950
[22] Filed: Jun. 1, 1981
[51] Int. Cl.³ .............................................. D05B 3/02
[52] U.S. Cl. ............................ 112/158 F; 112/158 E; 40/491
[58] Field of Search ........... 112/158 F, 158 E, 158 R, 112/158 A, 158 B, 258; 40/491, 508, 509

[56] References Cited

U.S. PATENT DOCUMENTS 2,298,730 10/1942 Alvari ................................ 40/491 X
4,055,131 10/1977 O'Brien et al. ................. 112/158 E
4,079,683 3/1978 Hanyu et al. ..................... 112/158 F

FOREIGN PATENT DOCUMENTS 52-117356 2/1977 Japan ................................ 112/158 F

*Primary Examiner*—Peter P. Nerbun
*Attorney, Agent, or Firm*—David L. Davis; Robert E. Smith; Edward L. Bell

[57] ABSTRACT

An electronically controlled multiple pattern sewing machine is provided with a pattern selection and informational display arrangement which includes a sliding card having thereon stitch pattern and associated informational indicia. A mask covers the card, which may be moved by an operator to make visible only a selected group of pattern indicia and associated informational indicia. A pattern from this visible group may then be selected by an operator.

5 Claims, 4 Drawing Figures

SWITCH PATTERN SELECTION AND INFORMATIONAL DISPLAY ARRANGEMENT FOR A MULTIPLE PATTERN SEWING MACHINE

DESCRIPTION

BACKGROUND OF THE INVENTION

This invention relates to electronically controlled multiple pattern sewing machines and, more particularly, to a stitch pattern selection and informational display arrangement for such sewing machines.

Sewing machines employing sophisticated electronic technology for the storage and subsequent retrieval of stitch pattern information for a multiplicity of patterns have enjoyed great commercial success in recent years. With the advent of integrated circuitry and single chip microcomputers, great savings in space have been achieved and the number of patterns which may be stored in the sewing machine's memory is virtually unlimited. U.S. Pat. Nos. 3,913,506 and 4,177,744 disclose pattern display and selection arrangements for electronically controlled multiple pattern sewing machines wherein all of the patterns which may be sewn by the sewing machine are at all times displayed to the operator. Unfortunately, an array of two dozen or more selectable patterns tends to confuse an operator. Adding to the confusion that an operator suffers when being overwhelmed by a large number of selectable patterns is the fact that at any given time the operator only desires to sew a single type of stitch such as, for example, a construction stitch, a buttonhole stitch, a hemming stitch or a decorative stitch. Thus, the operator is forced to find from among all of the possible stitches, a smaller group of stitches of the type desired to be sewn and then to select a particular stitch from among this group. It is therefore an object of the present invention to provide a pattern selection and display arrangement for an electronically controlled multiple pattern sewing machine which is easy to use without confusing the operator.

It would also be desirable to provide on the sewing machine itself "task aid" information to inform the operator of the particular application for which each type of stitch is suited and also as to which attachments should be utilized for each of the different stitches. It is therefore another object of this invention to provide such task aid information in juxtaposition with the pattern display.

SUMMARY OF THE INVENTION

The foregoing and additional objects are attained in accordance with the principles of this invention by providing a stitch pattern selection and informational display arrangement for use in an electronically controlled multiple pattern sewing machine, the arrangement comprising a graphics element having thereon a plurality of stitch pattern indicia arranged in groups and a plurality of sets of informational indicia, each of the sets of informational indicia being associated with a respective stitch pattern indicium, means for masking the graphics element to make visible at any time only the stitch pattern indicia from one of the groups and the corresponding sets of informational indicia, and operator influenced shifting means for relatively positioning the masking means with respect to the graphics element so as to selectively make visible a desired group of the stitch pattern indicia and the corresponding sets of informational indicia.

BRIEF DESCRIPTION OF THE DRAWINGS

The foregoing will be more readily apparent upon reading the following description in conjunction with the drawings wherein.

DETAILED DESCRIPTION

Figure 1:
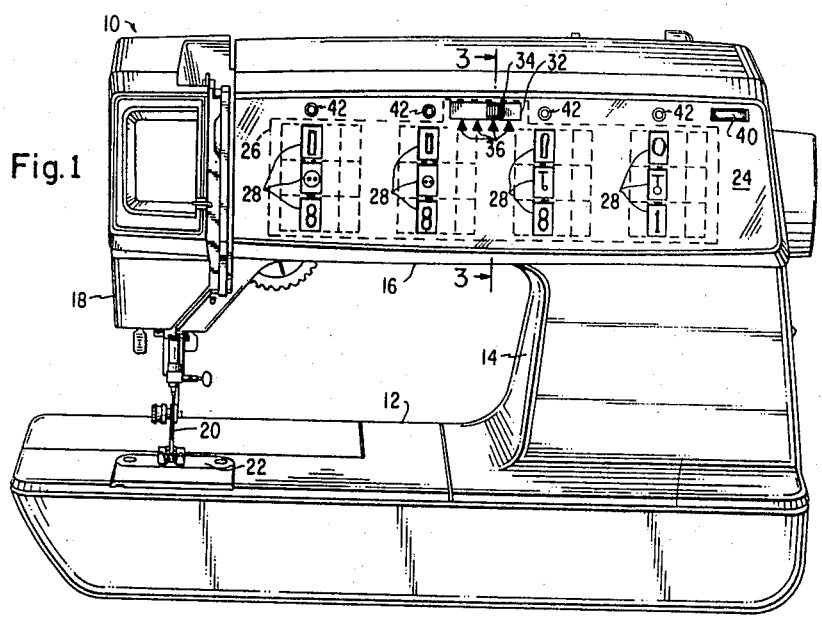
FIG. 1 is a front elevational view of a sewing machine including a stitch pattern selection and informational display arrangement constructed in accordance with the principles of this invention.

Referring now to the drawings, wherein like elements in different figures thereof have the same reference character applied thereto, the sewing machine designated generally by the reference numeral 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate 22 on the bed 12 to transport the work across the bed 12 between needle penetrations. The pattern of stitches produced by operation of the sewing machine, i.e., the positional coordinates of each stitch penetration, may be influenced, for example, by data stored in a memory unit, as disclosed in U.S. Pat. No. 3,872,808. Briefly, the subject matter of U.S. Pat. No. 3,872,808 includes means for controlling the lateral jogging of the needle 20 and/or the direction or magnitude of feed motion of the work feed dog in response to electronic stitch pattern data extracted from a solid state read only memory carried in the sewing machine frame in timed relation with the operation of the sewing machine. This patent discloses an approach for selection of any specific one out of a plurality of different groups of stitch position coordinate pattern data stored in the memory, which approach is compatible with the present invention and which involves a choice of any particular pattern by selective identification of the address of the starting word of the pattern in the memory.

One manner of providing an arrangement for selecting one out of a plurality of stitch patterns is disclosed in U.S. Pat. No. 3,913,506, which is incorporated herein by reference. This patent discloses an operator influenced switching arrangement by which any selected one of a plurality of stitch patterns may be rendered effective in a sewing machine in which the stitch pattern information is stored in a static read only memory. The number of different operator influenced controls is but a small fraction of the total number of possible pattern selections. In the disclosed construction, the total number of patterns are divided into groups and a first switch means is provided for selecting a group. Second electrical switch means are provided for selecting a pattern within the selected group.

Another approach to pattern selection is disclosed in U.S. Pat. No. 4,005,664, which is incorporated herein by reference. This patent discloses a system by which operator influenced closure of a single electric switch can effect the selection of any one of a multiplicity of stitch patterns stored in an electronic memory in a sewing machine. Pattern selection can be effected either by repeated closure of the single switch, by a scanning system rendered effective by continuous closure of the single switch, or by a combination of both of these modes.

Figure 2:
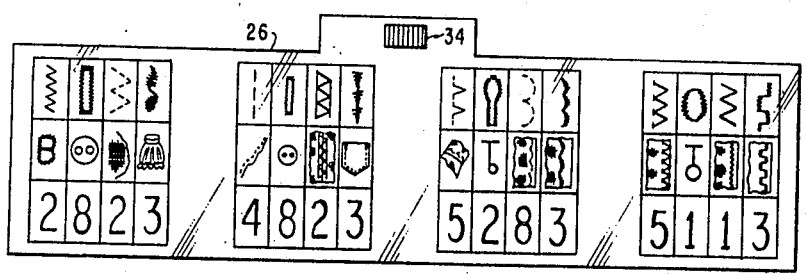
FIG. 2 is a front elevational view of the graphics element utilized in the display arrangement of FIG. 1.

In accordance with the principles of this invention, the sewing machine 10 is provided with a stitch pattern selection and informational display arrangement on the face 24 of the bracket arm 16. This arrangement includes a graphics element 26, clearly shown in FIG. 2. As shown in FIG. 2, the graphics element 26 has thereon stitch pattern and informational indicia arranged in an ordered array. In this array, the upper row has graphical representations of all the patterns which may be sewn by the sewing machine 10. The second and third rows are the informational indicia associated with each of the respective stitch pattern indicia, with the second row illustratively showing an application for the stitch pattern and the third row indicating which of the numbered attachments should be utilized when sewing the respective stitch patterns. As shown in FIG. 2, the pattern and informational indicia are arranged in blocks and also within groups according to stitch type. Thus, for example, the group of construction stitches are the first (leftmost) column within each block; the group of buttonhole stitches are the second column within each block; the group of hemming stitches are the third column within each block; and the group of decorative stitch patterns are the fourth (rightmost) column within each block.

As shown in FIG. 1, the face 24 is generally opaque and is formed with a plurality of optically transparent windows 28. The graphics element 26 is disposed behind the face 24 and the windows 28 are arranged to expose at any one time only one column from each of the blocks of indicia on the graphics element 26. In particular, it is the same column within each of the blocks that is exposed, i.e., either the first column from each of the blocks, the second column from each of the blocks, etc. The face 24 therefore acts as a mask. To position the appropriate group of indicia within the windows 28, the graphics element 26 is slidably mounted within the arm 16. As illustratively shown in FIG. 3, a stepped portion 30 of the bracket arm 16 holds the graphics element 26, as covered by the face 24. The face 24 further includes an opening 32 and the graphics element 26 includes a tab member 34 which extends out through the opening 32. An operator may therefore slide the graphics element 26 back and forth in a direction generally parallel to the face 24 by means of the tab member 34. The face 24 is preferably provided with marks 36 near the opening 32. The tab member 34 is then placed opposite a selected one of the marks 36 to expose a selected group of indicia. The marks may be color coded along with the indicia on the graphics element 26 which correspond thereto. Alternatively, the marks 36 may be numbered and the operator may be provided with a table showing which group of stitches correspond to the different numbers.

Figure 3:
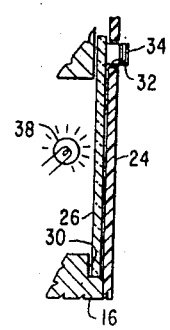
FIG. 3 is a cross sectional view taken along the line 3—3 of FIG. 1.

As shown in FIG. 3, the graphics element 26 may be transparent and back lit from a source of light 38. Alternatively, the graphics element 26 may be transparent and be edge lit from a source of light. Further, the graphics element may be illuminated merely by the ambient light.

To select a pattern, the operator chooses what type of stitch is to be sewn and then moves the tab member 34 opposite the corresponding mark 36. There will then be displayed through the windows 28 the different stitch patterns within the selected group along with indicia showing an application for the individual stitch patterns and the attachments which should be utilized when sewing that particular stitch pattern. As disclosed in the aforereferenced U.S. Pat. Nos. 3,913,506 and 4,005,664, switching means are provided which are responsive to the position of the tab member 34 for providing a first signal corresponding to the visible group of stitch pattern indicia. In accordance with the disclosure of the aforereferenced U.S. Pat. No. 3,913,506, individual switches (not shown) may be provided for selecting the corresponding one of the visible stitch patterns, i.e., a switch is provided for each column of windows 28. Alternatively, as disclosed in the referenced U.S. Pat. No. 4,005,664, a single switch 40 may be provided to effect a scan of the visible stitch patterns. In either case, means for combining the signals generated by the switch corresponding to the position of the tab member 34 and the operator actuable switch provides a stitch pattern selection signal. Further, a plurality of indicating elements 42, illustratively small incandescent lamps or light emitting diodes, are provided to give a visual indication of which of the stitch patterns within the visible group of stitch patterns has been selected.

Figure 4:
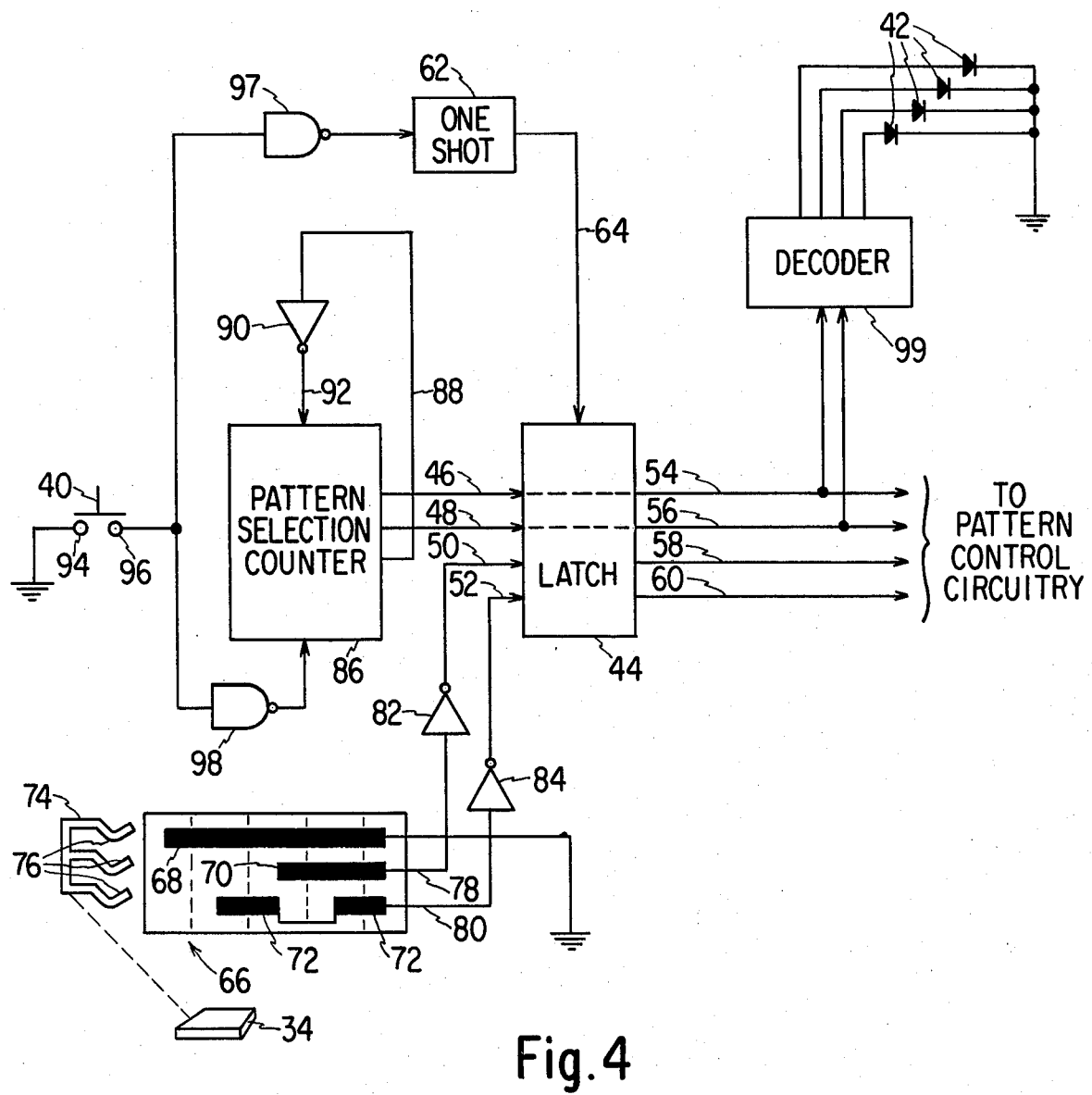
FIG. 4 is a circuit diagram of pertinent portions of an illustrative pattern selection system which may be utilized to practice this invention.

Referring now to FIG. 4, shown therein is a circuit diagram of pertinent portions of an illustrative pattern selection system which may be utilized to practice the present invention. In this illustrative pattern selection system, pattern selection is influenced by repeated closure of the switch 40, in accordance with the position of the tab member 34. This sytem is fully disclosed in U.S. Pat. No. 4,005,664, which has been incorporated herein by reference, and accordingly only a portion of the system is illustrated in FIG. 4.

The illustrative pattern selection system includes a latch 44 having four input lines 46, 48, 50 and 52 and four output lines 54, 56, 58 and 60. Preferably, the signals appearing on the input and output lines from the latch 44 will be arranged in a binary sequence and a one shot multivibrator 62 is arranged to provide a signal on the line 64 to operate the latch 44 to provide a continuous output on the output lines 54–60 corresponding to whatever input signal is applied to the latch on the input lines 46–52.

Indicated generally by the reference character 66 is a slide switch which includes contact strips 68, 70 and 72 and a brush element 74 having fingers 76. The brush element 74 is coupled for movement with the tab member 34. Accordingly, as the tab member 34 is moved to one of the four possible positions opposite one of the marks 36 (FIG. 1) the fingers 76 apply ground between the contact strip 68 and a binary coded combination of the contact strips 70 and 72. Accordingly, a binary coded combination of low or off signals is provided on the lines 78 and 80 to the inverters 82 and 84, respectively. The outputs of the inverters 82 and 84 are the inputs 50 and 52, respectively, to the latch 44.

The inputs 46 and 48 to the latch 44 come from a pattern selection counter 86. Preferably, the counter 86 is capable of counting through more than four states and includes an output line 88 which is rendered conductive when the number counted reaches four. The line 88 is directed to an inverter 90, the output 92 of which is connected to reset the counter 86.

The pattern selector switch 40 has a contact 94 connected to ground and a contact 96 connected to the input of a NAND gate 97, the output of which is connected to the one shot multivibrator circuit 62. The contact 96 of the pattern selector switch 40 is also connected to the input of a NAND gate 98, the output of which is connected so as to pulse the counter 86 whenever the pattern selector switch 40 is pushed.

The outputs 54–60 of the latch 44 are directed to pattern control circuitry, in a manner disclosed in the aforereferenced U.S. Pat. No. 4,005,664. The outputs 54 and 56 of the latch 44, which correspond to the inputs 46 and 48, respectively, to the latch 44 are directed to a decoder 99 which controls which one of the light emitting diodes 42 is lit so as to give a visual indication of which of the stitch patterns within the visible group of stitch patterns has been selected.

In summary, the slide switch 66 responds to the position of the tab member 34 to provide a first signal corresponding to the visible group of the stitch pattern indicia. The operator actuable switch 40, in combination with the pattern selection counter 66, provides a second signal indicative of a selected one of the stitch pattern indicia within the visible group. The latch 44 combines the first and second signals to provide at its output a stitch pattern selection signal. The decoder 99 and the light emitting diodes 42 respond to the aforedescribed second signal controlled by the switch 40 to provide a visual indication of which of the stitch patterns within the visible group has been selected.

Accordingly, there has been disclosed a stitch pattern selection and informational display arrangement for an electronically controlled multiple pattern sewing machine. It is understood that the above-described arrangement is merely illustrative of the application of the principles of this invention. Numerous other arrangements may be devised by those skilled in the art without departing from the spirit and scope of this invention, as defined by the appended claims.

I claim:

1. A stitch pattern selection and informational display arrangement for use in an electronically controlled multiple pattern sewing machine comprising:
   a graphics element having thereon a plurality of stitch pattern indicia arranged in groups and a plurality of sets of informational indicia, each of said sets of informational indicia being associated with a respective stitch pattern indicium, said graphics element comprising a card having the stitch pattern and informational indicia printed thereon, said card being slidably mounted for back and forth sliding motion;
   means for masking said graphics element to make visible at any time only the stitch pattern indicia from one of said groups and the corresponding sets of informational indicia, said masking means including a fixed opaque element with a plurality of optically transparent window regions;
   operator influenced shifting means for relatively positioning said masking means with respect to said graphics element so as to selectively make visible a desired group of said stitch pattern indicia and the corresponding sets of informational indicia, said shifting means including a tab member extending outwardly from said card to a region where its position can be influenced by an operator;
   first switching means responsive to the position of said shifting means for providing a first signal corresponding to the visible group of said stitch pattern indicia;
   operator actuable second switching means for providing a second signal indicative of a selected one of said stitch patterns indicia within said visible group; and
   means for combining said first and second signals to provide a stitch pattern selection signal.

2. The arrangement according to claim 1 further including means responsive to said second signal for providing a visual indication of which of said stitch patterns within said visible group is selected.

3. The arrangement according to claim 1 wherein the different groups of stitch pattern and informational indicia on said graphics element are color coded.

4. The arrangement according to claims 1 or 3 wherein said graphics element is transparent and the arrangement further includes means for back lighting said graphics element.

5. The arrangement according to claims 1 or 3 wherein said graphics element is transparent and the arrangement further includes means for edge lighting said graphics element.

* * * * *